US012205747B2

(12) United States Patent
Bong et al.

(10) Patent No.: US 12,205,747 B2
(45) Date of Patent: Jan. 21, 2025

(54) COIL COMPONENT

(71) Applicant: SAMSUNG ELECTRO-MECHANICS CO., LTD., Suwon-si (KR)

(72) Inventors: Kang Wook Bong, Suwon-si (KR); Jae Youn Park, Suwon-si (KR); Jin Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 856 days.

(21) Appl. No.: 17/215,778

(22) Filed: Mar. 29, 2021

(65) Prior Publication Data

US 2022/0208433 A1 Jun. 30, 2022

(30) Foreign Application Priority Data

Dec. 28, 2020 (KR) ........................ 10-2020-0184277

(51) Int. Cl.
*H01F 27/29* (2006.01)
*H01F 27/28* (2006.01)
(Continued)

(52) U.S. Cl.
CPC ......... *H01F 27/2804* (2013.01); *H01F 27/29* (2013.01); *H01F 27/323* (2013.01);
(Continued)

(58) Field of Classification Search
CPC .... H01F 27/2804; H01F 27/29; H01F 27/323; H01F 41/041; H01F 41/122; H01F 2027/2809; H01F 27/324; H01F 2017/048; H01F 27/292; H01F 17/0013; H01F 27/28; H01F 27/306; H01F 27/32; H01F 17/0006
See application file for complete search history.

(56) References Cited

U.S. PATENT DOCUMENTS

2015/0035640 A1 2/2015 Wang et al.
2016/0086720 A1* 3/2016 Jeong .................... H01F 27/292 336/200
(Continued)

FOREIGN PATENT DOCUMENTS

CN 104733155 A * 6/2015 ........... H01F 27/006
JP 2014-080674 A 5/2014
KR 10-2016-0132593 A 11/2016

*Primary Examiner* — Tuyen T Nguyen
(74) *Attorney, Agent, or Firm* — Morgan, Lewis & Bockius LLP

(57) ABSTRACT

A coil component includes a body, a support substrate disposed within the body, a coil disposed on at least one surface of the support substrate, and first and second external electrodes disposed to be spaced apart from each other on the body and connected to the coil. The coil unit includes a first conductive layer disposed on the support substrate, a second conductive layer disposed on the first conductive layer and spaced apart from the support substrate, and a third conductive layer disposed on the second conductive layer to cover at least a portion of a side surface of the second conductive layer and spaced apart from the support substrate to expose a side surface of the first conductive layer.

28 Claims, 8 Drawing Sheets

(51) Int. Cl.

| | |
|---|---|
| ***H01F 27/32*** | (2006.01) |
| ***H01F 41/04*** | (2006.01) |
| ***H01F 41/12*** | (2006.01) |

(52) U.S. Cl.
CPC ......... *H01F 41/041* (2013.01); *H01F 41/122* (2013.01); *H01F 2027/2809* (2013.01)

(56) References Cited

U.S. PATENT DOCUMENTS

| | | | | |
|---|---|---|---|---|
| 2016/0336105 | A1 | 11/2016 | Choi et al. | |
| 2018/0197672 | A1* | 7/2018 | Kim | H01F 17/0013 |

* cited by examiner

COIL COMPONENT

CROSS-REFERENCE TO RELATED APPLICATION

This application claims benefit of priority to Korean Patent Application No. 10-2020-0184277 filed on Dec. 28, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices along with a resistor and a capacitor.

Thin film-type inductors are manufactured by forming a coil unit on a substrate by plating and subsequently forming and curing a resin composite prepared by mixing a filler and a resin on the substrate to produce a component body, and forming external electrodes on the exterior of the component body.

SUMMARY

An aspect of the present disclosure may provide a coil component in which a height of a coil unit is increased, while the number of plating processes is reduced.

According to an aspect of the present disclosure, a coil component may include: a body; a support substrate disposed within the body; a coil disposed on at least one surface of the support substrate; and first and second external electrodes disposed to be spaced apart from each other on the body and connected to the coil. The coil unit may include: a first conductive layer disposed on the support substrate; a second conductive layer disposed on the first conductive layer and spaced apart from the support substrate; and a third conductive layer disposed on the second conductive layer to cover at least a portion of a side surface of the second conductive layer and spaced apart from the support substrate to expose a side surface of the first conductive layer.

According to an aspect of the present disclosure, a coil component may include: a body; a support substrate disposed within the body; a coil including a first conductive layer disposed on the support substrate, a second conductive layer disposed on the first conductive layer, and a third conductive layer disposed on the second conductive layer and covering at least a portion of a side surface of the second conductive layer; an insulating film covering the coil, disposed between the coil unit and the body, and being in contact with a side surface of the first conductive layer; and first and second external electrodes disposed to be spaced apart from each other on the body and connected to the coil.

According to an aspect of the present disclosure, a coil component may include: a body; a support substrate disposed within the body; a coil disposed on the support substrate; and first and second external electrodes disposed to be spaced apart from each other on the body and connected to the coil. The coil may include: a second conductive layer disposed on the support substrate, and having an upper surface and a lower surface opposing the upper surface and a side surface connecting the upper surface to the lower surface; and a third conductive layer disposed on the upper surface of the second conductive layer and covering a portion of the side surface of the second conductive layer, the third conductive layer spaced apart from the support substrate.

According to an aspect of the present disclosure, a coil component may include: a body; a support substrate disposed within the body; a coil including: a second conductive layer disposed on the support substrate, and having an upper surface and a lower surface opposing the upper surface and a side surface connecting the upper surface to the lower surface, and a third conductive layer disposed on the upper surface of the second conductive layer and covering a portion of the side surface of the second conductive layer; an insulating film covering the coil, disposed between the coil and the body, and being in contact with another portion of the side surface of the second conductive layer; and first and second external electrodes disposed to be spaced apart from each other on the body and connected to the coil.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Various types of electronic components are used in electronic devices, and various types of coil components may be appropriately used between the electronic components for the purpose of removing noise.

That is, in an electronic device, a coil component may be used as a power inductor, a high frequency (HF) inductor, a general bead, a high frequency bead (GHz bead), a common mode filter, and the like.

Figure 1:
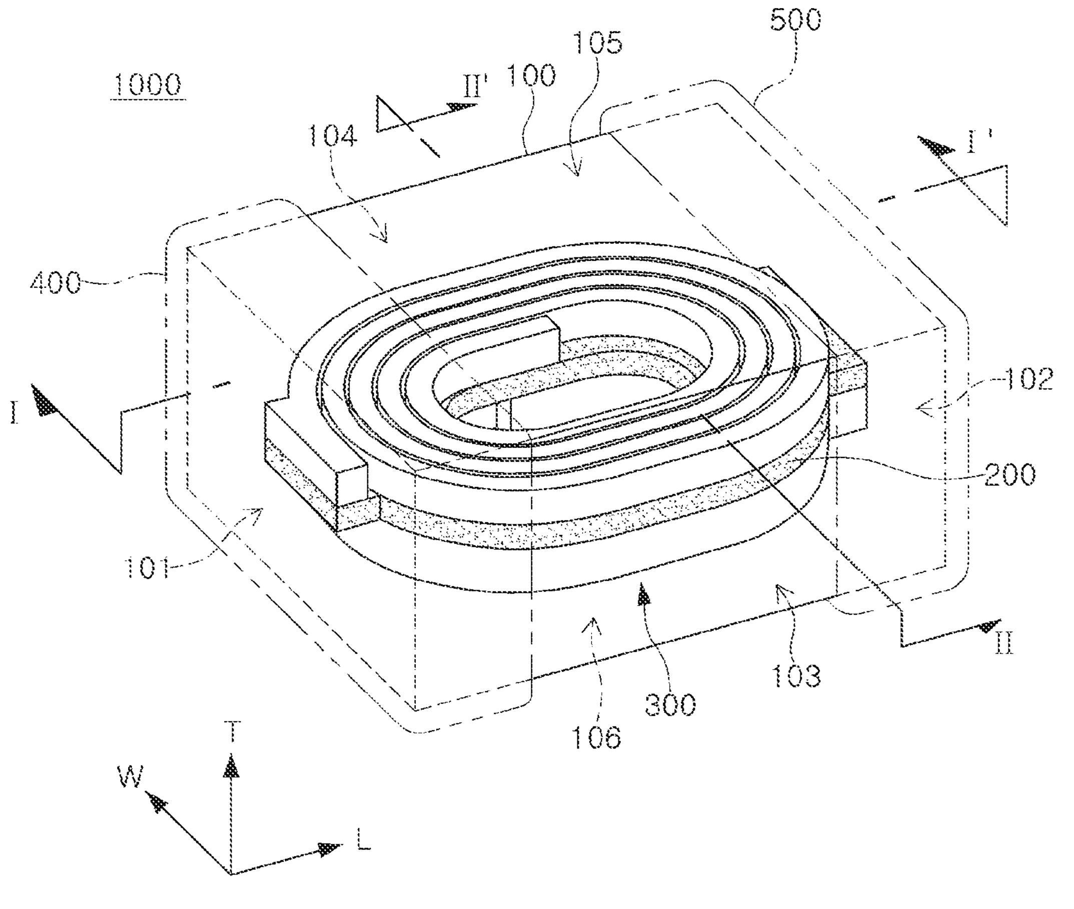
FIG. 1 is a view schematically illustrating a coil component according to an exemplary embodiment of the present disclosure.
Figure 2:
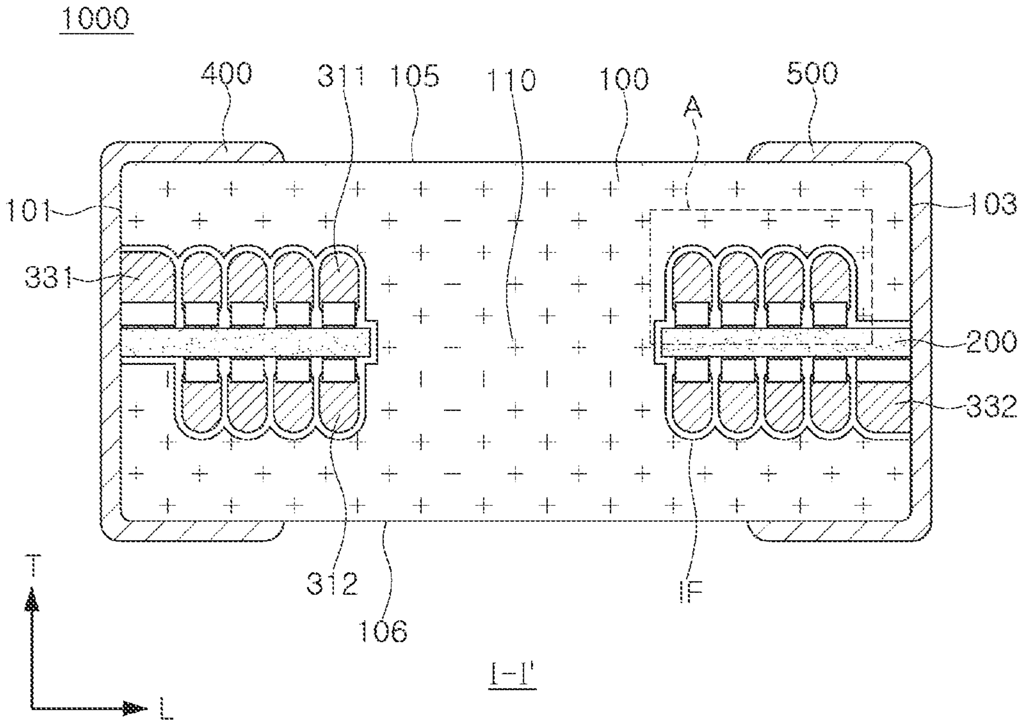
FIG. 2 is a cross-sectional view taken along line I-I' of FIG. 1.
Figure 3:
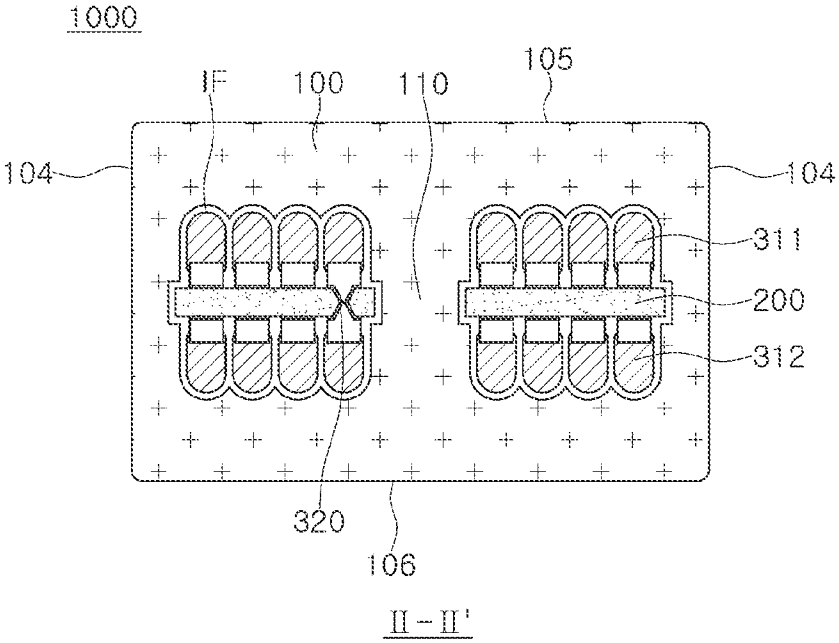
FIG. 3 is a cross-sectional view taken along line II-II' of FIG. 1.
Figure 4:
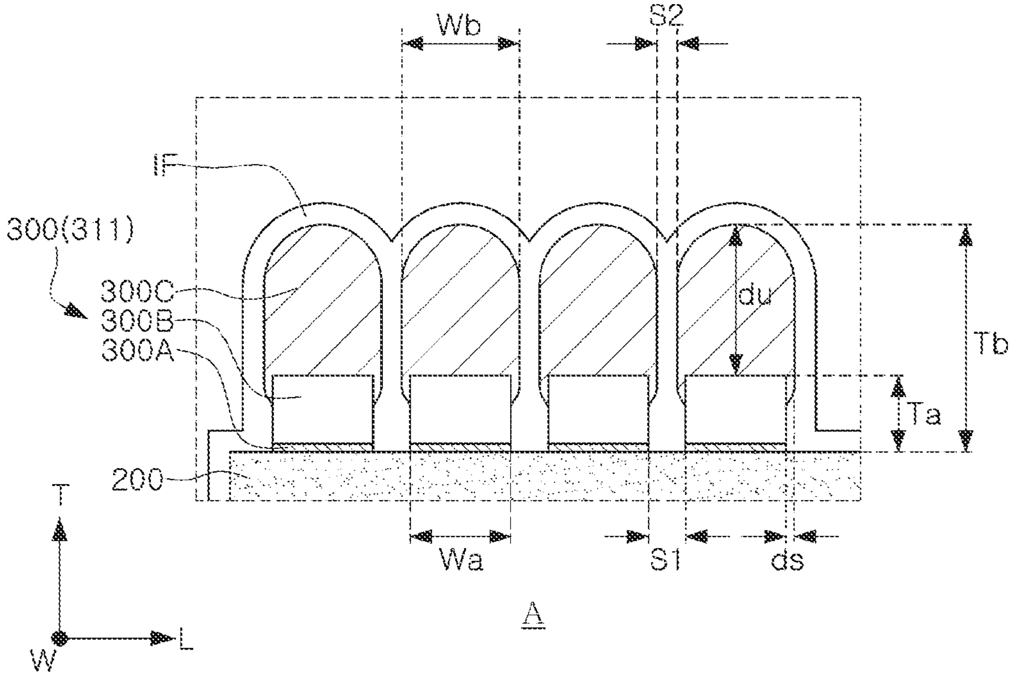
FIG. 4 is an enlarged schematic view of an example of portion A of FIG. 2.
Figure 5:
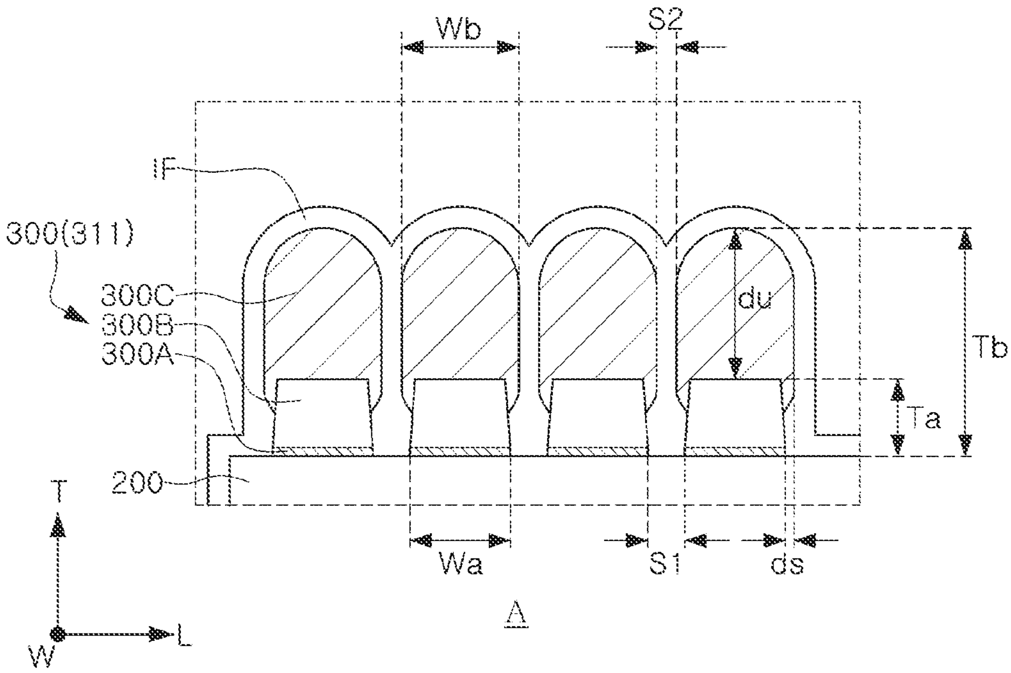
FIG. 5 is an enlarged schematic view of another example of portion A of FIG. 2.
Figure 6:
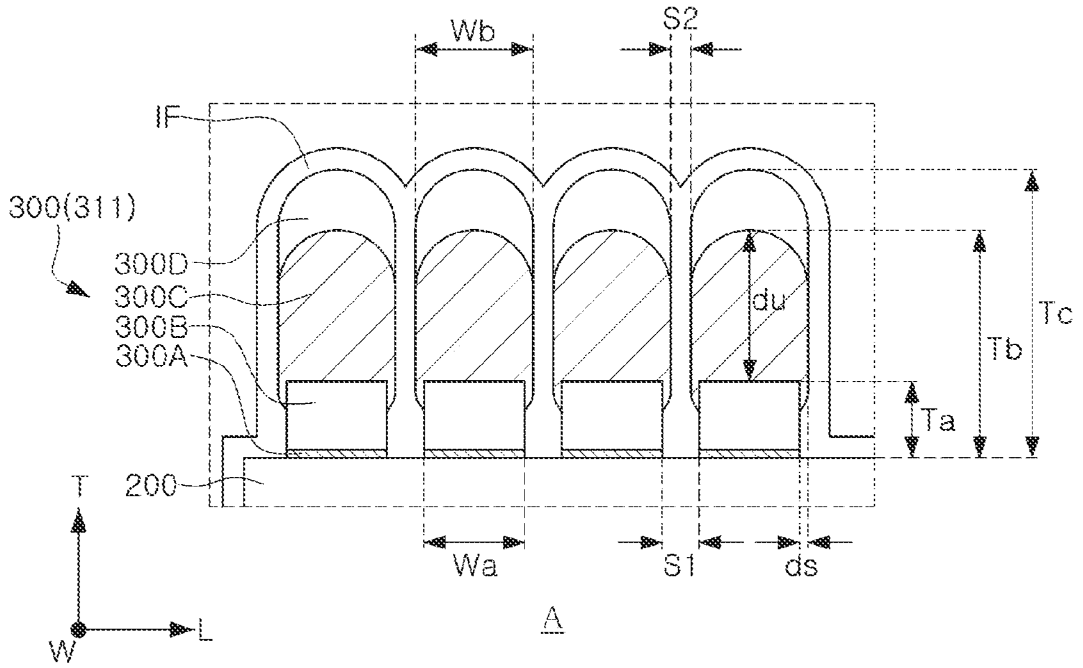
FIG. 6 is an enlarged schematic view of another example of portion A of FIG. 2.

FIG. 1 is a view schematically illustrating a coil component according to an exemplary embodiment of the present disclosure. FIG. 2 is a cross-sectional view taken along line I-I' of FIG. 1. FIG. 3 is a cross-sectional view taken along line II-II' of FIG. 1. FIG. 4 is an enlarged schematic view of an example of portion A of FIG. 2. FIG. 5 is an enlarged schematic view of another example of portion A of FIG. 2. FIG. 6 is an enlarged schematic view of another example of portion A of FIG. 2. FIGS. 7A through 7E are views sequentially illustrating a manufacturing process of a coil unit illustrated in FIG. 4.

Referring to FIGS. 1 through 4, a coil component 1000 according to an exemplary embodiment of the present disclosure includes a body 100, a support substrate 200, a coil unit 300, external electrodes 400 and 500, and an insulating film IF.

The body 100 forms the exterior of the coil component 1000 according to this exemplary embodiment, and the coil unit 300 and the support substrate 200 are disposed therein.

The body 100 may be formed in the shape of a hexahedron as a whole.

Based on the directions of FIGS. 1, 2, and 4, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 is a wall surface of the body 100 that connects the fifth surface 105 and the sixth surface 106 of the body 100. Hereinafter, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100, respectively. The sixth surface 106 of the body 100 may be provided as a mounting surface when the coil component 1000 according to the present exemplary embodiment is mounted on a mounting board such as a printed circuit board (PCB) or the like.

By way of example, the body 100 may be formed such that the coil component 1000 according to the present exemplary embodiment including external electrodes 400 and 500, to be described later, has a length of 2.0 mm, a width of 1.2 mm, and a thickness of 0.65 mm, but is not limited thereto. Meanwhile, the aforementioned dimensions are merely design values that do not reflect process errors, etc., and thus, it should be appreciated that dimensions within a range admitted as a process error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 described above may refer to an arithmetic mean value of the lengths of at least two of the plurality of segments parallel in the length direction L when the outermost boundary lines of the coil component 1000 illustrated in the cross-sectional image are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of the lengths of at least two of the plurality of segments parallel in the thickness direction T when the outermost boundary lines of the coil component 1000 illustrated in the cross-sectional image are connected.

Based on an optical microscope or SEM image for a length directional (L)-width directional (W) cross-section at a thickness-directional (T)-central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 described above may refer to an arithmetic mean value of the lengths of at least two of the plurality of segments parallel in the width direction W when the outermost boundary lines of the coil component 1000 illustrated in the cross-sectional image are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include an insulating resin and a filler dispersed in the insulating resin. The filler may be a dielectric material or a magnetic material. The magnetic material may be ferrite or magnetic metal powder particle. The dielectric material may be an organic filler or an inorganic filler. For example, the body 100 may be formed by stacking one or more magnetic composite sheets in which a magnetic metal powder particle is dispersed in an insulating resin.

Ferrite may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder particle may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder particle may be at least one of pure iron powder particle, Fe—Si-based alloy powder particle, Fe—Si—Al-based alloy powder particle, Fe—Ni-based alloy powder particle, Fe—Ni—Mo-based alloy powder particle, Fe—Ni—Mo—Cu-based alloy powder particle, Fe—Co-based alloy powder particle, Fe—Ni—Co-based alloy powder particle, Fe—Cr-based alloy powder particle, Fe—Cr—Si alloy powder particle, Fe—Si—Cu—Nb-based alloy powder particle, Fe—Ni—Cr-based alloy powder particle, and Fe—Cr—Al-based alloy powder particle.

The magnetic metal powder particle may be amorphous or crystalline. For example, the magnetic metal powder particle may be Fe—Si—B—Cr-based amorphous alloy powder particle, but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder particle, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

The filler may have an average diameter of about 0.1 μm to 30 μm, but is not limited thereto.

The body 100 may include two or more types of fillers dispersed in a resin. Here, the different types of fillers refer to that fillers dispersed in a resin are distinguished from each other by any one of an average diameter, a composition, crystallinity, a shape, and a magnetic characteristic (e.g., whether permeability is the same).

Meanwhile, hereinafter, it is assumed that the filler is magnetic metal powder particle, but the scope of the present disclosure is not limited only to the body 100 having a structure in which the magnetic metal powder particle is dispersed in the insulating resin.

The insulating resin may include, but is not limited to, epoxy, polyimide, liquid crystal polymer, or the like alone or in combination.

The body 100 includes a core 110 penetrating a central portion of each of the support substrate 200 and the coil unit 300, to be described later. The core 110 may be formed by filling a through hole penetrating through the central portion of each of the coil unit 300 and the support substrate 200 by the magnetic composite sheet, but is not limited thereto.

The support substrate 200 is disposed within the body 100. The support substrate 200 is configured to support the coil unit 300, to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imageable dielectric (PID), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder particle, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 200 is advantageous in reducing the thickness of the coil component 1000 according to the present exemplary embodiment. In addition, an effective volume of the coil unit 300 and/or the magnetic material may be increased based on a component having the same volume, thereby improving component characteristics. When the support substrate 200 is formed of an insulating material including a photosensitive insulating resin, the number of processes for forming the coil unit 300 may be reduced, which is advantageous in reducing production cost and forming fine vias.

The coil unit 300 is disposed on the support substrate 200 and disposed within the body 100. The coil unit 300 manifests the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 includes coil patterns 311 and 312, a via 320, and lead patterns 331 and 332.

Specifically, based on the directions of FIGS. 1, 2, and 3, the first coil pattern 311 and the first lead pattern 331 are disposed on an upper surface of the support substrate 200 facing the fifth surface 105 of the body 100, and the second coil pattern 312 and the second lead pattern 332 are disposed on the lower surface of the support substrate 200 facing the upper surface of the support substrate 200.

Referring to FIGS. 1 through 3, the first coil pattern 311 is in contact with and connected to the first lead pattern 331 on the upper surface of the support substrate 200. The second coil pattern 312 is in contact with and connected to the second lead pattern 332 on the lower surface of the support substrate 200. The via 320 is in contact with and connected to an inner end of each of the first coil pattern 311 and the second coil pattern 312 through the support substrate 200. The first lead pattern 331 is exposed to the first surface 101 of the body 100 and is in contact with and connected to the first external electrode 400, to be described later, disposed on the first surface 101 of the body 100. The second lead pattern 332 is exposed to the second surface 102 of the body 100 and is in contact with and connected to the second external electrode 500, to be described later, disposed on the second surface 102 of the body 100. Accordingly, the coil unit 300 may function as a single coil connected in series between the first external electrode 400 and the second external electrode 500.

Each of the first coil pattern 311 and the second coil pattern 312 may have a shape of a flat spiral in which at least one turn is formed around the core 110. For example, the first coil pattern 311 may form at least one turn around the core 110 on the upper surface of the support substrate 200.

The coil unit 300 may include at least three conductive layers 300A, 300B, and 300C. Specifically, the coil unit 300 includes a first conductive layer 300A disposed on the support substrate 200, a second conductive layer 300B disposed on the first conductive layer 300A and spaced apart from the support substrate 200, and a third conductive layer 300C disposed on the second conductive layer 300B, covering at least a portion of a side surface of the second conductive layer 300B, and spaced apart from the support substrate 200 to expose a side surface of the first conductive layer 300A. Meanwhile, since the coil unit 300 has the coil patterns 311 and 312, the via 320, and the lead patterns 331 and 332, each of the coil patterns 311 and 312, the via 320, and the lead patterns 331 and 332 includes the first to third conductive layers 300A, 300B, and 300C. Hereinafter, only the first coil pattern 311 will be described with reference to FIG. 4, but each of the second coil pattern 312, the first and second lead patterns 331 and 332, and the via 320 also includes the first to third conductive layers 300A, 300B, and 300C to be described in relation to the first coil pattern 311.

Referring to FIG. 4, the first coil pattern 311 includes the first conductive layer 300A in contact with the upper surface of the support substrate 200, the second conductive layer 300B disposed on the first conductive layer 300A and spaced apart from the support substrate 200, and the third conductive layer 300C disposed on the second conductive layer 300B, covering at least a portion of the side surface of the second conductive layer 300B, and spaced apart from the support substrate 200 to expose the side surface of the first conductive layer 300A.

The first conductive layer 300A may be a seed layer for forming the second conductive layer 300B by plating. The first conductive layer 300A may include, for example, at least one of molybdenum (Mo), nickel (Ni), titanium (Ti), and chromium (Cr). In the present exemplary embodiment, the first conductive layer 300A may be formed by a vapor deposition method such as sputtering or the like and may include molybdenum (Mo), but the scope of the present disclosure is not limited thereto. A thickness of the first conductive layer 300A may be 5 μm or less. The first conductive layer 300A having a thickness of greater than 5 μm is not economical. Meanwhile, based on an optical microscope or a scanning electron microscope (SEM) image of a cross-section taken in a length direction (L)-thickness direction (T) of the body 100 at a central portion of the body 100 in the width direction W, a thickness of the first conductive layer 300A may refer to a maximum value of lengths of a plurality of segments parallel to the thickness direction T when two boundary lines of the first conductive layer 300A illustrated in the image facing each other in the thickness direction T, among outermost boundary lines of the first conductive layer 300A, are connected. Alternatively, the thickness of the first conductive layer 300A may refer to a minimum value of lengths of the plurality of segments parallel to the thickness direction T when two boundary lines of the first conductive layer 300A illustrated in the cross-sectional image facing each other in the thickness direction T, among the outermost boundary lines of the first conductive layer 300A, are connected. Alternatively, the thickness of the first conductive layer 300A may refer to an arithmetic mean value of at least two lengths of the plurality of segments parallel to the thickness direction T when two boundary lines of the first conductive layer 300A illustrated in the cross-sectional image facing each other in the thickness direction T, among the outermost boundary lines of the first conductive layer 300A, are connected. Meanwhile, in calculating the thickness of the first conductive layer 300A by the method described above, if the coil unit 300 has a plurality of turns, the thickness of the first conductive layer 300A may be calculated by applying the aforementioned method to only the first conductive layer 300A of any one turn, or thicknesses of the first conductive layer 300A at each of at least two turns may be calculated using the aforementioned method, and an arithmetic mean value thereof may be used as the thickness of the first conductive layer 300A. In one example, measurement of a parameter, such as a thickness or a width of an element, or the like, may be performed based on an optical microscope or a scanning electron microscope (SEM) image of a cross-section of the coil component. The present disclosure is not limited thereto. Other methods and/or tool appreciated by one of ordinary skill in the art, even if not described in the present disclosure, may also be used.

The second conductive layer 300B is disposed on the first conductive layer 300A and spaced apart from the support substrate 200. That is, the second conductive layer 300B may be disposed to be in contact with the first conductive layer 300A to expose the side surface of the first conductive layer 300A. As an example, referring to FIGS. 4 and 7A through 7D, the first and second conductive layers 300A and 300B may be formed by forming a metal film 300A' on the entirety of the upper surface of the support substrate 200 (FIG. 7A), forming a plating resist R for forming the second conductive layer on the metal film 300A' (FIG. 7A), filling an opening O of the plating resist with the second conductive layer 300B (FIG. 7B), removing the plating resist R from the upper surface of the support substrate 200 (FIG. 7C), and removing a portion of the metal film 300A' exposed to the outside due to the removal of the plating resist R (FIG. 7D). By forming the first and second conductive layers 300A and 300B through this exemplary manufacturing process, the second conductive layer 300B may expose the side surface of the first conductive layer 300A.

The second conductive layer 300B may be formed by electroplating using the first conductive layer 300A as a seed layer. The second conductive layer 300B may include a metal different from that of the first conductive layer 300A. For example, when the first conductive layer 300A includes molybdenum (Mo), the second conductive layer 300B may include at least one of nickel (Ni), titanium (Ti), chromium (Cr), and copper (Cu), and may be an electrolytic copper plating layer, for example. A thickness Ta of the second conductive layer 300B may be, for example, 100 μm or more and 200 μm or less, but is not limited thereto. An area (or a width) of the lower surface of the second conductive layer 300B in contact with the first conductive layer 300A may be the substantially same as an area (or a width) of the upper surface. That is, the second conductive layer 300B may have a rectangular shape based on a cross-section perpendicular to one surface of the support substrate 200 (e.g., a longitudinal direction (L)-thickness directional (T) cross-section as illustrated in FIGS. 2 and 4). A dimension such as an area or a width of an element being substantially the same as that of another element may mean that the dimension of the element and the dimension of the another element are exactly the same, and also mean that a difference between the dimension of the element and the dimension of the another element is within a process error or a measurement error recognizable by one of ordinary skill in the art.

A space S1 between the second conductive layers 300B of adjacent turns may be 10 μm or less. As will be described later, a width growth of the third conductive layer 300C (growth in the length direction L based on the direction of FIG. 4) from the side surface of the second conductive layer 300B is extremely limited, a risk of an electrical short between adjacent turns of the third conductive layer 300C of the coil unit 300 is low even if the space S1 between the adjacent turns of the second conductive layer 300B is 10 μm or less. Meanwhile, based on the optical microscope or scanning electron microscope (SEM) image of a cross-section taken in a length direction (L)-thickness direction (T) of the body 100 at a central portion of the body 100 in the width direction W, the space S1 between the second conductive layers 300B may refer to a maximum value among lengths of each of a plurality of segments parallel to the length direction L when facing boundary lines between the second conductive layers 300B of adjacent turns of the coil unit 300 illustrated in the image are connected. Alternatively, the space S1 between the second conductive layers 300B may refer to a minimum value among the lengths of each of a plurality of segments parallel to the length direction L when facing boundary lines between the second conductive layers 300B of adjacent turns of the coil unit 300 illustrated in the image of the cross-section are connected. Alternatively, the space S1 between the second conductive layers 300B may refer to an arithmetic mean value of at least two of the lengths of each of a plurality of segments parallel to the length direction L when facing boundary lines between the second conductive layers 300B of adjacent turns of the coil unit 300 illustrated in the image of the cross-section are connected.

The third conductive layer 300C is disposed on the second conductive layer 300B to cover at least a portion of the side surface of the second conductive layer 300B and is spaced apart from the support substrate 200 to expose a side surface of the first conductive layer 300A. Since the third conductive layer 300C is located at a level between upper and lower surfaces of the second conductive layer 300B, the third conductive layer 300C covers at least a portion of the side surface of the second conductive layer 300B and exposes the side surface of the first conductive layer 300A.

The third conductive layer 300C may be formed by electroplating using the second conductive layer 300B as a seed layer. In the third conductive layer 300C, a thickness of a region disposed on the upper surface of the second conductive layer 300B is greater than a width of a region disposed on the side surface of the second conductive layer 300B. That is, the third conductive layer 300C may have an anisotropic shape in which growth along a longitudinal direction is greater than that along a transverse direction. Due to the anisotropic shape of the third conductive layer 300C (du>>ds), a cross-sectional area of a conductor configuring the coil unit 300 may be further increased, while an electric short-circuit ($S2 \neq 0$) between adjacent turns of the final coil on which the third conductive layer 300C is formed is prevented. For example, the third conductive layer 300C may be formed by performing anisotropic plating on the second conductive layer 300B. In this case, a total number of processes may be reduced based on the thickness Tb of the final coil. That is, in realizing the thickness Tb of the final coil to exceed 100 μm, if the final coil is realized by a pattern plating method using a plating resist, at least two or more plating resists and at least two or more plating processes are required due to limitations of the current technology. However, in the case of this exemplary embodiment, since the second conductive layer 300B is formed by pattern plating using a plating resist and the third conductive layer 300C is formed by anisotropic plating using the second conductive layer 300B as a seed layer, it is possible to omit at least one plating resist lamination, exposure, and development process, compared with the related art.

Meanwhile, based on the optical microscope or scanning electron microscope (SEM) image of a cross-section taken in a length direction (L)-thickness direction (T) of the body 100 at the central portion of the body 100 in the width direction W, the thickness of the region of the third conductive layer 300C disposed on the upper surface of the second conductive layer 300B may refer to a maximum value among lengths along the thickness direction T of each of the plurality of segments connecting a boundary line corresponding to an upper surface of the second conductive layer 300B and a boundary line corresponding to an upper surface of the third conductive layer 300C illustrated in the image. Alternatively, the thickness of the region of the third conductive layer 300C disposed on the upper surface of the second conductive layer 300B may refer to a minimum value among the lengths along the thickness direction T of each of the plurality of segments connecting the boundary line corresponding to the upper surface of the second conductive layer 300B and the boundary line corresponding to the upper surface of the third conductive layer 300C illustrated in the image of the cross-section. Alternatively, the thickness of the region of the third conductive layer 300C disposed on the upper surface of the second conductive layer 300B may refer to an arithmetic mean value of lengths along the thickness direction T of at least two of the plurality of segments connecting the boundary line corresponding to the upper surface of the second conductive layer 300B and the boundary line corresponding to the upper surface of the third conductive layer 300C illustrated in the image of the cross-section.

Also, based on the optical microscope or scanning electron microscope (SEM) image of a cross-section taken in a length direction (L)-thickness direction (T) of the body 100 at the central portion of the body 100 in the width direction W, the width of the region of the third conductive layer 300C disposed on the side surface of the second conductive layer 300B may refer to a maximum value among lengths of each of a plurality of segments connecting, in the length direction L, a virtual line extending from the side surface of the second conductive layer 300B in the thickness direction T and a virtual line extending from the side surface of the third conductive layer 300C illustrated in the image in the thickness direction T. Alternatively, the width of the region of the third conductive layer 300C disposed on the side surface of the second conductive layer 300B may refer to a minimum value among the lengths of each of a plurality of segments connecting, in the length direction L, the virtual line extending from the side surface of the second conductive layer 300B in the thickness direction T and the virtual line extending from the side surface of the third conductive layer 300C illustrated in the image of the cross-section in the thickness direction T. Alternatively, the width of the region of the third conductive layer 300C disposed on the side surface of the second conductive layer 300B may refer to an arithmetic mean value of lengths of at least two of the plurality of segments connecting, in the length direction L, the virtual line extending from the side surface of the second conductive layer 300B in the thickness direction T and the virtual line extending from the side surface of the third conductive layer 300C illustrated in the image of the cross-section in the thickness direction T.

The third conductive layer 300C may have a shape in which an upper surface is convex upward in a cross-section perpendicular to the upper surface of the support substrate 200. That is, the upper surface of the third conductive layer 300C may be an upwardly convex curved surface. In this case, since an angled portion of the third conductive layer 300C may be minimized, direct current resistance Rdc of the coil unit 300 may be reduced.

The third conductive layer 300C may include, for example, at least one of molybdenum (Mo), nickel (Ni), titanium (Ti), and chromium (Cr). In the present exemplary embodiment, the third conductive layer 300C may be a copper anisotropic plating layer, but the scope of the present disclosure is not limited thereto.

As an example, when the first coil pattern 311, the via 320, and the first lead pattern 331 are formed by plating on the upper surface side of the support substrate 200, the first conductive layers 300A of the first coil pattern 311, the via 320, and the first lead pattern 331 may be formed together during the same process so as to be integrally formed with each other. That is, a boundary may not be formed between the first conductive layers 300A of the first coil pattern 311, the via 320, and the first lead pattern 331.

The insulating film IF is disposed between the coil unit 300 and the body 100 and between the support substrate 200 and the body 100. The insulating film IF may be formed on the surface of the support substrate 200 on which the coil patterns 311 and 312 and the lead patterns 331 and 332 are formed, but is not limited thereto. The insulating film IF serving to insulate the coil unit 300 and the body 100 may include a known insulating material such as parylene, but is not limited thereto. As another example, the insulating film IF may include an insulating material such as an epoxy resin other than parylene. The insulating film IF may be formed by a vapor deposition method, but is not limited thereto. As another example, the insulating film IF may be formed by laminating and curing an insulating film for forming the insulating film IF on both surfaces of the support substrate 200 on which the coil unit 300 is formed, or the coil unit 300 may be formed by applying an insulating paste for forming the insulating film IF on both surfaces of the formed support substrate 200 on which the coil unit 300 is formed, and curing the same. The insulating film IF may be formed to fill a space between turns of the coil unit 300. In this case, the insulating film IF is in contact with side surfaces of each of the first and second conductive layers 300A and 300B.

The first and second external electrodes 400 and 500 are disposed spaced apart from each other on the sixth surface 106 of the body 100. In this exemplary embodiment, the first and second external electrodes 400 and 500 cover the first and second surfaces 101 and 102 of the body 100, respectively, and extend to at least a portion of each of the third to sixth surfaces 103, 104, 105, and 106 of the body 100. Specifically, the first external electrode 400 covers the first surface 101 of the body 100 and is in contact with and connected to the first lead pattern 331 exposed to the first surface 101 of the body 100 and extends to at least a portion of each of the third and sixth surfaces 103, 104, 105, and 106 of the body 100 from the first surface 101 of the body 100. The second external electrode 500 covers the second surface 102 of the body 100, is in contact with and connected to the second lead pattern 332 exposed to the second surface 102 of the body 100, and extends from the second side 102 of the body 100 to at least a portion of each of the third to sixth sides 103, 104, 105, and 106 of the body 100.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but is not limited thereto. The external electrodes 400 and 500 may have a structure of a single layer or multiple layers. For example, the first external electrode 400 may include a first layer disposed on the body 100 and a second layer disposed on the first layer. The first layer may be a copper (Cu) plating layer or a conductive resin layer. The conductive resin layer may be formed by applying a conductive paste in which conductive powder particle containing copper (Cu) and/or silver (Ag) is dispersed in a resin to the body 100 and curing the same. The second layer may include nickel (Ni) and tin (Sn). The second layer may include, for example, a nickel plating layer disposed on the first layer and including nickel (Ni) and a tin plating layer disposed on the nickel plating layer and including tin (Sn), but the scope of the present disclosure It is not limited thereto.

Hereinafter, an example of a method of manufacturing the coil unit illustrated in FIG. 4 will be described with reference to FIGS. 7A through 7E.

Figure 7A:
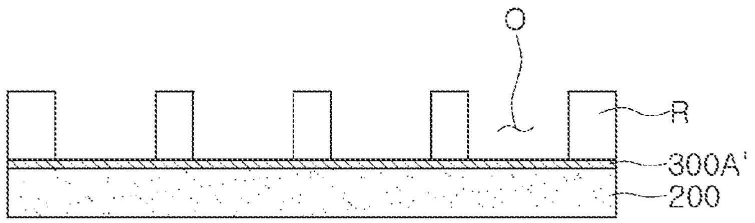
FIGS. 7A through 7E are views sequentially illustrating a manufacturing process of a coil unit illustrated in FIG. 4.

First, referring to FIG. 7A, a metal film 300A' and a plating resist R are formed on the support substrate 200.

The metal film 300A' is a component that becomes the first conductive layer 300A described above through a follow-up process and may be a seed layer for plating the second conductive layer 300B of the coil unit 300.

The metal film 300A' is formed on one entire surface of the support substrate 200. Meanwhile, a via hole for forming the above-described via 320 may be formed in the support substrate 200, and the metal film 300A' may be formed to cover one surface of the support substrate and the entire inner wall of the via hole.

The metal film 300A' may be formed by a vapor deposition process such as an electroless plating process or sputtering. The metal film 300A' may include at least one of gold (Au), nickel (Ni), lead (Pb), titanium (Ti), chromium (Cr), molybdenum (Mo), or an alloy thereof and may be formed to have at least one layer. The metal film 300A' may include, for example, molybdenum (Mo), but the scope of the present disclosure is not limited thereto.

The plating resist R is a plating resist for selectively plating the second conductive layer 300B. The plating resist R may be formed by forming an insulating material for forming an insulating wall on one entire surface of the support substrate 200 and patterning the insulating material to have an opening O having the same diameter as a line width Wa of the second conductive layer 300B and the same line width as the space S1 of the second conductive layer 300B. The opening O may be formed through photolithography, but is not limited thereto.

The plating resist (R) may include, for example, a photosensitive material including a cyclic ketone compound and an ether compound having a hydroxy group as a main component. Here, the cyclic ketone compound may be, for example, cyclopentanone, etc., and the ether compound having a hydroxy group may be, for example, polypropylene glycol monomethyl ether. Alternatively, the insulating wall 20 may include a photosensitive material containing a bisphenol-based epoxy resin as a main component, and here, the bisphenol-based epoxy resin may be, for example, bisphenol A novolac epoxy resin, bisphenol A diglycidyl ether bisphenol A polymer resin, or the like. However, the scope of the present disclosure is not limited thereto.

Figure 7B:
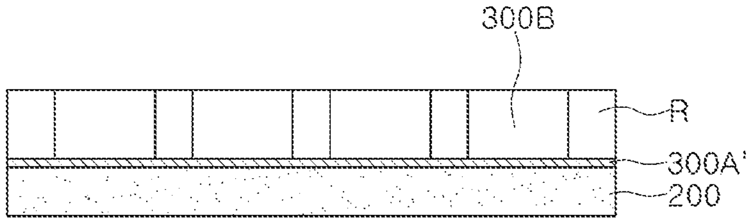

Next, referring to FIG. 7B, the second conductive layer 300B is formed in the opening O of the plating resist R.

The second conductive layer 300B may be formed by plating-filling the opening O of the plating resist R using the metal film 300A' as a seed layer. The second conductive layer 300B may include copper (Cu) as an example, but the scope of the present disclosure is not limited thereto. Meanwhile, the second conductive layer 300B may be overplated to a thickness greater than a thickness of the plating resist R and then polished to expose an upper surface of the plating resist R, but the scope of the present disclosure is not limited thereto. The second conductive layer 300B may be formed through a single plating process so that an interface does not exist therein, or may be formed through at least two plating processes to have an interface therein.

Figure 7C:
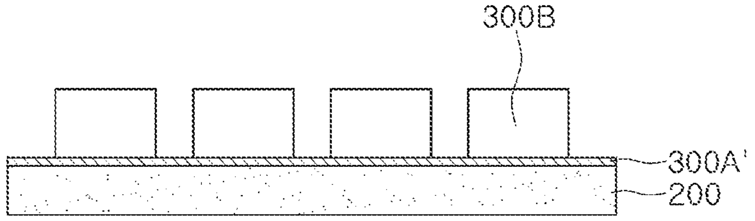
Figure 7D:
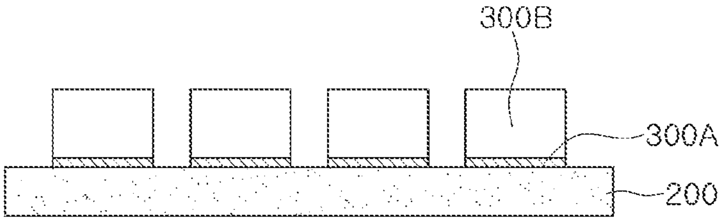

Next, referring to FIG. 7C, the plating resist R is removed.

The plating resist R may be removed with a stripper or may be removed with a laser.

Next, referring to FIG. 7D, the metal film 300A' is removed.

The metal film 300A' exposed by the removal of the plating resist R is removed by chemical etching to become the above-described first conductive layer 300A. Since the metal film 300A' and the second conductive layer 300B contain different metals, the second conductive layer 300B may not be removed in the metal film 300A' removing process. Accordingly, it is possible to prevent conductor loss of the coil.

Figure 7E:
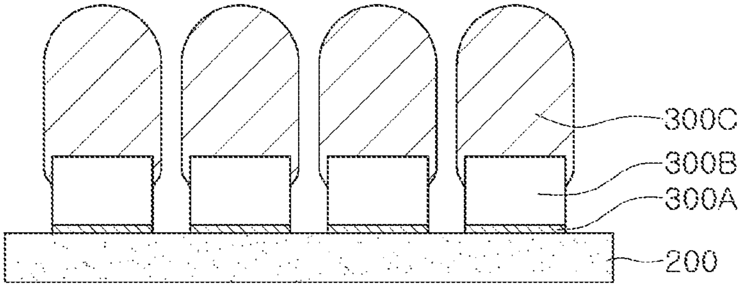

Next, referring to FIG. 7E, a third conductive layer 300C is formed.

The third conductive layer 300C may be formed through anisotropic plating without forming a separate plating resist in a space between turns of the adjacent second conductive layer 300B by using the second conductive layer 300B as a seed layer.

Thereafter, the process of forming the insulating film IF and the process of forming the body 100 described above may be followed.

FIG. 5 is an enlarged schematic diagram of another example of portion A of FIG. 2. FIG. 6 is an enlarged schematic view of another example of the portion A of FIG. 2.

Referring to FIG. 5, in the case of another exemplary embodiment of the present disclosure, an area (or a width) of a lower surface of the second conductive layer 300B in contact with the first conductive layer 300A may be larger than an area (or a width) of the upper surface. This may be implemented, for example, by forming the opening O in the plating resist R for forming the second conductive layer 300B by plating to be large on the lower surface of the plating resist R and to be small on the upper surface of the plating resist R. In this exemplary embodiment, since the area of the lower surface of the second conductive layer 300B is larger than the area of the upper surface of the second conductive layer 300B, the side surface of the second conductive layer 300B is inclined, and as a result, a contact area between the third conductive layer 300C and the second conductive layer 300B increases to reduce contact resistance, etc., thereby improving component characteristics.

When an area of a cross-section parallel to the upper surface of the support member 200 is referred to as a cross-sectional area, the cross-sectional area of the second conductive layer 300B may increase from the upper surface of the second conductive layer 300B to the lower surface of the second conductive layer 300B. That is, the second conductive layer 300B may have an inverted tapered cross-sectional shape whose width increases from top to bottom based on a cross-section perpendicular to the upper surface of the support member 200.

Referring to FIG. 6, in the case of another exemplary embodiment of the present disclosure, the coil unit 300 may further include a fourth conductive layer 300D disposed on the third conductive layer 300C and exposing at least a portion of the side surface of the third conductive layer 300C. That is, unlike in one exemplary embodiment of the present disclosure, in the present exemplary embodiment, the coil unit 300 may have a final coil structure including four or more layers. By additionally forming the fourth conductive layer 300D, a volume of the coil unit 300, which is a conductor, may be increased.

Like the third conductive layer 300C, the fourth conductive layer 300D may have an anisotropic shape in which lateral growth is suppressed and longitudinal growth is remarkably large. That is, a thickness of a region of the fourth conductive layer 300D disposed on the upper surface of the third conductive layer 300C may be greater than a width of a region of the fourth conductive layer 300D disposed on a side surface of the third conductive layer 300C. As an example, the fourth conductive layer 300D may be formed by performing anisotropic plating on the third conductive layer 300C, but the scope of the present disclosure is not limited thereto.

As set forth above, according to exemplary embodiments of the present disclosure, the height of the coil unit may be increased, while the number of plating processes is reduced.

While exemplary embodiments have been shown and described above, it will be apparent to those skilled in the art that modifications and variations could be made without departing from the scope of the present disclosure as defined by the appended claims.

What is claimed is:

1. A coil component comprising:
a body;
a support substrate disposed within the body;
a coil disposed on at least one surface of the support substrate; and
first and second external electrodes disposed to be spaced apart from each other on the body and connected to the coil,
wherein the coil includes:
a first conductive layer disposed on the support substrate;
a second conductive layer disposed on the first conductive layer and spaced apart from the support substrate; and
a third conductive layer disposed on the second conductive layer to cover at least a portion of a side surface of the second conductive layer and spaced apart from the first conductive layer, and
a side surface of the first conductive layer is exposed from the second conductive layer.

2. The coil component of claim 1, wherein the second conductive layer has a lower surface and an upper surface connected to side surfaces of the second conductive layer, respectively, and facing each other, and in a cross-section perpendicular to the one surface of the support substrate, a thickness of a region of the third conductive layer disposed on the upper surface of the second conductive layer is greater than a width of a region of the third conductive layer disposed on the side surface of the second conductive layer.

3. The coil component of claim 1, wherein an area of a lower surface of the second conductive layer in contact with the first conductive layer is substantially the same as an area of an upper surface of the second conductive layer.

4. The coil component of claim 1, wherein an area of a lower surface of the second conductive layer in contact with the first conductive layer is greater than an area of an upper surface of the second conductive layer.

5. The coil component of claim 4, wherein an area of a cross-section, parallel to the one surface of the support member, of the second conductive layer increases from the upper surface of the second conductive layer toward the lower surface of the second conductive layer.

6. The coil component of claim 1, wherein an upper surface of the third conductive layer has a convex shape in a cross-section perpendicular to the one surface of the support substrate.

7. The coil component of claim 1, wherein the coil further includes a fourth conductive layer disposed on the third conductive layer, exposing at least a portion of a side surface of the third conductive layer.

8. The coil component of claim 7, wherein a thickness of a region of the fourth conductive layer, disposed on the upper surface of the third conductive layer, is greater than a width of a region of the fourth conductive layer disposed on the side surface of the third conductive layer, in a cross-section perpendicular to the one surface of the support substrate.

9. The coil component of claim 1, wherein the coil includes a plurality of turns on the one surface of the support substrate, and a space between the second conductive layers of adjacent turns among the plurality of turns is 10 μm or less.

10. The coil component of claim 1, wherein the first and second conductive layers include different metals.

11. The coil component of claim 10, wherein the second conductive layer includes copper (Cu).

12. The coil component of claim 10, wherein the first conductive layer includes at least one of titanium (Ti), chromium (Cr), and molybdenum (Mo).

13. The coil component of claim 1, wherein a thickness of the first conductive layer is 5 μm or less.

14. The coil component of claim 1, wherein a width of a lower surface of the second conductive layer in contact with the first conductive layer is substantially the same as a width of an upper surface of the second conductive layer.

15. The coil component of claim 1, wherein a width of a lower surface of the second conductive layer in contact with the first conductive layer is greater than a width of an upper surface of the second conductive layer.

16. The coil component of claim 1, further comprising another coil disposed on another surface of the support substrate, wherein the first conductive layer is disposed in a via hole in the support substrate, and the second conductive layer extends into the via hole to connect to the another coil.

17. A coil component comprising:

a body;

a support substrate disposed within the body;

a coil including a first conductive layer disposed on the support substrate, a second conductive layer disposed on the first conductive layer, and a third conductive layer disposed on a flat upper surface of the second conductive layer and covering at least a portion of a side surface of the second conductive layer;

an insulating film covering the coil, disposed between the coil and the body, and being in contact with a side surface of the first conductive layer; and first and second external electrodes disposed to be spaced apart from each other on the body and connected to the coil, wherein the third conductive layer is spaced apart from the first conductive layer.

18. The coil component of claim 17, wherein the insulating film is in contact with a portion of the second conductive layer.

19. A coil component comprising:

a body;

a support substrate disposed within the body;

a coil disposed on the support substrate; and first and second external electrodes disposed to be spaced apart from each other on the body and connected to the coil, wherein the coil includes:

a second conductive layer disposed on the support substrate, and having a flat upper surface and a lower surface opposing the upper surface and a side surface connecting the upper surface to the lower surface; and a third conductive layer disposed on the flat upper surface of the second conductive layer and covering only a portion of the side surface of the second conductive layer, the third conductive layer spaced apart from the support substrate.

20. The coil component of claim 19, wherein a thickness of a region of the third conductive layer disposed on the flat upper surface of the second conductive layer is greater than a width of a region of the third conductive layer disposed on the side surface of the second conductive layer.

21. The coil component of claim 19, wherein an upper surface of the third conductive layer has a convex shape.

22. The coil component of claim 19, wherein the coil further includes a fourth conductive layer disposed on the third conductive layer, exposing at least a portion of a side surface of the third conductive layer.

23. The coil component of claim 19, wherein a width of the lower surface of the second conductive layer is substantially the same as a width of the flat upper surface of the second conductive layer.

24. The coil component of claim 19, wherein a width of the lower surface of the second conductive layer is greater than a width of the upper surface of the second conductive layer.

25. A coil component comprising:

a body;

a support substrate disposed within the body;

a coil including:

a second conductive layer disposed on the support substrate, and having a flat upper surface and a lower surface opposing the flat upper surface and a side surface connecting the upper surface to the lower surface, and a third conductive layer disposed on the flat upper surface of the second conductive layer and covering a portion of the side surface of the second conductive layer;

an insulating film covering the coil, disposed between the coil and the body, and being in contact with another portion of the side surface of the second conductive layer; and first and second external electrodes disposed to be spaced apart from each other on the body and connected to the coil.

26. The coil component of claim 25, wherein a thickness of a region of the third conductive layer disposed on the flat upper surface of the second conductive layer is greater than a width of a region of the third conductive layer disposed on the side surface of the second conductive layer.

27. The coil component of claim 25, wherein an upper surface of the third conductive layer has a convex shape.

28. The coil component of claim 25, wherein the coil further includes a fourth conductive layer disposed on the third conductive layer, and the insulating film is in contact with a portion of the third conducive layer.

* * * * *